Patented Oct. 30, 1951

2,572,879

UNITED STATES PATENT OFFICE 2,572,879

METHOD OF COLD BONDING PLASTICIZED RESIN SHEETS TO OTHER SURFACES

Thomas C. Morris, Lexington, and Eric C. Johnson, Somerville, Mass., assignors to B. B. Chemical Co., Boston, Mass., a corporation of Massachusetts No Drawing. Application April 2, 1948,
Serial No. 18,708

21 Claims. (Cl. 154—139)

This invention relates to bonding of plasticized resin sheet material to surfaces which may or may not be of the same resin, and particularly relates to providing a finish or surface sheet of a plasticized resin on a nonresin base.

Plasticized resin sheet materials are eminently suited for use as surface coverings because of their fine appearance and because they are waterproof and easily cleaned. Also the resinous sheets are flexible, somewhat elastic, and are resistant to abrasions and scratches.

Notwithstanding the desirability of providing plasticized resin surface sheets on base materials, numerous applications of resin sheets have been found impracticable because of the difficulty in securing the resin sheets in position. Because of the tendency of the resin sheet to tear, sewing or nailing of a resin sheet is often not a satisfactory method of securing the sheet in place.

Attempts have been made to secure resin sheets by means of solvent type cements. However, and particularly where a thin sheet is used, organic solvents frequently cause wrinkling, curling, distortion, or blistering of the resin sheet.

It is a feature of the invention to form a strongly adherent coating of a butadiene-acrylonitrile copolymer on the surface of a resin body.

It is another feature of this invention to provide a new method for adhering a plasticized resin material to a surface of another body of material.

We have discovered that an exceptionally strong bond is formed between a plasticized resin material and the residue left from coating the resin material with a latex of a copolymer of butadiene and acrylonitrile.

We have made the further discovery that with particular modified latices of copolymers of butadiene and acrylonitrile, the residue of the latices on plasticzed resin material, where the coating has been coagulated or otherwise changed to a translucent state by removal of water, develops a state persisting for a relatively long period in which it will adhere firmly to a similar coat of residue without the necessity of using great pressure to force them together or of maintaining pressure over the adhered surfaces. The modified latex possessing this property comprises dispersed butadiene-acrylonitrile copolymer in an aqueous phase comprising an agent or agents which increase the viscosity of the latex and which increase the period of self-adhesion during which the latex residue coat will adhere when pressed against a similar coat.

We have also made the surprising discovery that plasticized resin material will be adhered by maintaining it in contact with a freshly coagulated coating deposited from a modified latex of a copolymer of butadiene and acrylonitrile.

The term "latex" as employed in the specification and claims is to be understood in its usual sense as referring to a dispersion in an aqueous medium formed by polymerization of an aqueous emulsion of a monomer or mixture of monomers.

The plasticized resin material with which a bond is formed according to the present invention may comprise sheets, e. g., continuous films, or coatings, e. g., dried coatings of a lacquer on a metal, wood or other surface, constituted of various resinous materials including cellulose derivatives such as the cellulose esters including nitrocellulose, cellulose acetate, and cellulose acetobutyrate, the water insoluble cellulose ethers including ethyl cellulose; vinyl resins such as polyvinyl acetate, polyvinyl chloride, copolymerized vinyl acetate and vinyl chloride, polyvinyl acetals, copolymerized vinyl chloride and vinylidene chloride, polymerized vinylidene chloride, and polyvinyl butyral; rubber hydrochloride; polystyrene; and other plasticized sheet resin materials. Sheets comprising mixtures of these and other resins are also usable in the method of the present invention. The resinous sheet material bonded according to the present invention should contain at least 2% of an ester type plasticizer such as dibutyl phthalate, dibutyl sebacate, tricresyl phosphate and dioctyl phthalate.

As aqueous dispersions of butadiene-acrylonitrile copolymer, there may be used various commercial latices. "Perbunan G" and "Perbunan H," produced by Standard Oil Company of New Jersey, have been found useful and are emulsion copolymers of butadiene and acrylonitrile, the acrylonitrile constituting about 25% of the copolymer. Type "G" comprises about 50.1% copolymer solids and type "H" comprises about 55% copolymer solids. Other latices, such as "Hycar OR–15," which is produced by the Hycar Chemical Company of Akron, Ohio, and is also an emulsion copolymer of butadiene and acrylonitrile, may be used according to the present invention.

The modified butadiene-acrylonitrile copolymer latex for adhering plasticized resin materials, according to the present invention, may comprise known agents which thicken and improve the spreading of the latex on the plasticized resin material. Suitable agents for this purpose include ammonia-solubilized casein, Wilkinite and Bentonite.

Agents for use in the latex to increase the period of self-adhesion include highly soluble (i. e., at least about 20% in water) wetting agents possessing low detergent characteristics. Materials which have been found suitable are: "Naccosol A" (an alkyl aryl sulfonate sold by National Aniline Company of New York, N. Y.), "Darvan #1" (a polymerized sodium naphthalene sulfonate produced by Dewey & Almy Chemical Company, of Cambridge, Mass.), "Tergitol #7" (a sulfonated alcohol produced by Carbide and Carbon Chemicals Corporation, New York, N. Y.), "Oronite" (a wetting agent sold by the Oronite Corporation, of San Francisco, California) and "Ultrawet" (an aromatic sodium sulfonate produced by the Atlantic Refining Company, Philadelphia, Pa.). These agents will be employed in amount from about 0.25% to about 8%, preferably about 1% to about 2% based upon the weight of the latex.

The latex employed is preferably an emulsion copolymer of butadiene and acrylonitrile in which the acrylonitrile is about 10% to about 50%, suitably about 25% by weight of the copolymer. Suitably the latex will comprise about 40% or more of the copolymer solids. Optionally, agents, e. g., sulphur, zinc oxide, and suitable accelerators, such as Butyl Zimate or Butyl 8, for vulcanizing the copolymer, may be included in the latex or introduced into the emulsion immediately prior to use. No advantage, however, is found in vulcanizing the latex.

In accordance with one embodiment of our invention, a sheet of plasticized resin material is secured to another surface by coating the surface of the resin material and/or the other surface with a modified butadiene-acrylonitrile copolymer latex. Water is evaporated or otherwise removed, for example by absorption, from the latex. In the course of removal of water, a state is reached in which the milkiness of the latex disappears and a translucent, at least partially coagulated, film of residue remains. At this point it is found that the latex on a plasticized resin surface has developed self-adhesion or active adhesion characteristics such that if the residue-coated surface is pressed against a similar coated surface it will adhere immediately to that surface with appreciable strength and the bond thus formed will increase in strength to form a strong permanent union. It is also found that a residue coat on any surface, for example, a porous surface, while in this at least partially coagulated condition, will adhere to a plasticized resin which is maintained in contact with it for a period of time. For this last type of adhesion it is desirable to wash the resin with an organic solvent, such as naphtha or toluol, which will not soften or swell the resin.

This character of self-adhesion or active adhesion persists for a period which may be from one hour up to as much as twenty hours or more. The persistence of the adhesion characteristic is dependent upon a number of factors including the quantity of ammonia-cut casein based on the weight of the copolymer of butadiene and acrylonitrile, the kind and quantity of wetting agent, and upon the humidity of the atmosphere.

A particularly advantageous use of the new invention is the securing of resin sheets to metal surfaces. In this use of the invention, the metal surface, for example the surface of a sheet of aluminum or other metal foil, is coated with a lacquer primer, such as a solution of nitrocellulose and a plasticizer in an organic solvent with or without a coloring agent or dye. When the solvent has evaporated from the lacquer, a coating of a latex of a butadiene-acrylonitrile copolymer is applied to the dried lacquer film and coagulated or permitted to dry to the translucent state referred to above. A sheet of plasticized resinous material which may have on its surface a coating of latex, or which may have been washed with the above-referred to type of solvent is then applied to the latex coated surface of the lacquer on the metal surface. A strong bond is formed. Where a transparent resinous sheet material is applied to the surface of a metal foil, the metal foil is substantially strengthened, while at the same time the metallic luster of the foil is not substantially reduced. Thin strips cut from this material may be used in many relationships, for example in the weaving of cloth simulating a lamé.

In a modified form of the invention a relatively thick coating of butadiene-acrylonitrile latex is applied to the plasticized resin surface and, while the latex is still wet, the coated surface is brought into contact with a porous or bibulous surface which may or may not be coated with latex and maintained in contact with the surface until the emulsion has set.

The proportions of thickening agent and wetting agent required to provide the desired characteristics in the latex depend upon the method of adhering which is to be employed. Where a coat of emulsion is to be applied to a surface and water evaporated or otherwise removed to develop the characteristic of self-adherence or active adherence, there will be employed from about 1% to about 8%, preferably about 3% to about 6%, of ammonia-cut, i. e., ammonia-solubilized, casein based on the weight of the butadiene-acrylonitrile copolymer present in the latex. A greater percent of the casein will reduce adhesion to the resin and a smaller percent will reduce the ability of the films to adhere when pressed together and will reduce the strength of the ultimate bond. It is important that no fixed alkali be employed in latex for this method. In the latex for this type of adhesion the wetting agent will be employed in quantity of from about 0.25 to about 8%, preferably about 2% to about 4%, based on the weight of the latex.

Where a single coating of latex is to be applied to the resin and adhesion accomplished by pressing the wet coating of latex against a porous or bibulous surface, there will be employed from about 1% to about 8%, preferably about 1% to about 2%, based on the weight of the butadiene-acrylonitrile copolymer present in the latex, of a thickening agent in order that a thick coating of the latex may be formed on the resin surface.

In either of the two types of adhesion, the latex coating may be applied by spraying, brushing, dipping, or other convenient method.

The following examples are given only to illustrate the invention, and it is to be understood that the invention is not restricted to the specific proportions, ingredients or procedures disclosed in the examples.

*Example 1.*—100 parts by weight of Perbunan G latex containing 52% of butadiene-acrylonitrile copolymer was mixed with a solution comprising 10 parts by weight of a 9% ammonia-cut casein solution, 1.9 parts by weight of a 40% potassium hydroxide solution, and 6.3 parts by weight of a 37% formaldehyde solution. The mixture of latex and casein solution was a relatively thick and viscous paste having a viscosity of 50 to 100 Stormer using a 300 gram weight. The mixture of latex and casein solution was brushed on the surface of a sheet of Pliofilm P-4, obtained from the Goodyear Tire and Rubber Company of Akron, Ohio, which is understood to be rubber hydrochloride containing 2% dibutyl phthalate and 2% amyl stearate. The coated sheet was pressed against a cotton cloth surface while the latex was wet. At the end of three hours, the sheet of Pliofilm was found to adhere strongly to the cotton cloth.

*Example 2.*—100 parts of Perbunan G latex containing 52% solids were mixed with 30 parts by weight of a 9% ammonia-cut casein solution; 8 parts of 25% Naccosol A solution in water were added; and 5 parts by weight of a 37% formaldehyde solution were incorporated to remove ammonia odor. The resulting modified latex was a relatively thin fluid having a viscosity of 43 Stormer with a 50 gram weight. A lacquer primer of the following composition was prepared: 33.4 parts of nitrocellulose; 26.6 parts of dibutyl phthalate; and 40 parts of a resinous material known as "Beckacite 1120" (which is understood to be a maleic acid rosin reaction product) produced by Reichhold Chemicals, Inc. of Detroit, Michigan, is dissolved in a mixed solvent comprising ethyl acetate, butyl acetate, naphtha and butanol. This lacquer composition was applied to the aluminum foil and was permitted to dry. To the dried film of plasticized nitrocellulose, there was applied by spraying a coating of the modified Perbunan G latex and the coating was permitted to dry for one hour, at which time it had developed a translucent appearance. A 0.001 inch thick sheet of plasticized cellulose acetate, containing 52 to 55% acetic acid and having a viscosity range of 60 to 120 seconds as determined by the viscosity method given on page 8 of a booklet entitled "Hercules Cellulose Acetate," copyright 1941 by Hercules Powder Company of Wilmington, Delaware, the sheet being plasticized with 10% diethyl phthalate and 10% methyl phthalyl ethyl glycolate based on the weight of the sheet, was also coated with the above modified latex at the same time that the coating of latex was applied to the lacquer coated foil and was permitted to dry to the same condition. The coated surfaces were then pressed together and adhered immediately to form a strong bond.

*Example 3.*—The modified latex of Example 2 was sprayed on a wood surface and the coating permitted to dry until the film became translucent. A sheet of plasticized cellulose acetate (Kodapak) was washed with naphtha, pressed into contact with the coated surface, and maintained in contact overnight. It was found that the cellulose acetate sheet was firmly adhered to the coated wood surface.

While the invention has been illustrated by examples of adhesion of resin materials to cloth, to wood, and to other resinous materials, it will be understood that the invention is susceptible to use in many other relations. Thus, for example, the resin material may be adhered to a leather surface by coating either the resin surface or the leather surface or both surfaces with a latex compounded in accordance with the principles of the invention and thereafter pressing the plasticized resin material and leather together.

It is to be understood, accordingly, that the invention is not restricted to the specific examples and proportions given in the specification but is limited only by the claims appended hereto.

Methods of coating and bonding plasticized vinyl resin material are disclosed and claimed in applicants' prior application, Serial No. 687,700 of August 1, 1946.

Having thus described our invention, what we claim as new and desire to secure by Letters Patent of the United States is:

1. A method of cold bonding the surface of a continuous sheet of waterproof resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

2. A method of cold bonding the surface of a continuous sheet of waterproof resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, a hydrophilic colloidal thickening agent, and a wetting agent, and bringing the surfaces together.

3. A method of cold bonding the surface of a continuous sheet of cellulose derivative resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

4. A method of cold bonding the surface of a continuous sheet of cellulose ester resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

5. A method of cold bonding the surface of a continuous sheet of nitrocellulose resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

6. A method of cold bonding the surface of a continuous sheet of cellulose acetate resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

7. A method of cold bonding the surface of a continuous sheet of cellulose ether resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

8. A method of cold bonding the surface of a continuous sheet of ethyl cellulose resin material plasticized with an ester plasticizer to a porous surface of a body which comprises coating at least one of the surfaces to be adhered with a latex comprising an emulsion copolymer of butadiene and acrylonitrile in which the acrylonitrile content is from 10% to 50% of the copolymer, and bringing the surfaces together.

9. The method of cold bonding a continuous sheet of waterproof resin plasticized with an ester plasticizer to a metal surface which comprises coating the metal surface with a volatile organic solvent solution of a resin plasticized with an ester plasticizer, removing solvent from the coating, applying to at least one of the surfaces of the dried resin solution and of the plasticized resin sheet a latex comprising an emulsion copolymer of a butadiene and acrylonitrile, a hydrophilic colloidal thickening agent in quantity not exceeding 8% of the latex and a wetting agent, evaporating water from the latex to at least partially coagulate it and bring it to a translucent condition adhesive to plasticized resin, and bringing the surfaces together.

10. The method of cold bonding a continuous sheet of waterproof resin material plasticized with an ester plasticizer to a metal surface which comprises coating the metal surface with a volatile organic solvent solution of nitrocellulose and an ester plasticizer, removing solvent from the coating, applying to at least one of the surfaces of the dried nitrocellulose coating and of the plasticized resin sheet a latex comprising an emulsion copolymer of butadiene and acrylonitrile, a hydrophilic colloidal thickening agent in quantity not exceeding 8% of the latex and a wetting agent, evaporating water from the latex to at least partially coagulate it and bring it to a translucent condition adhesive to plasticized resin, and bringing the surfaces together.

11. A method of cold bonding the surface of a continuous sheet of waterproof resin material plasticized with an ester plasticizer to a porous surface of a body which comprises coating at least one of said surfaces with a latex comprising an emulsion copolymer of butadiene and acrylonitrile in which the acrylonitrile content is from 10% to 50% of the copolymer, and a water-soluble caseinate, bringing the surfaces together, and removing water from the latex to coagulate it.

12. A method of cold bonding the surface of a continuous sheet of waterproof resin material plasticized with an ester plasticizer to a porous surface of a body which comprises coating the surfaces to be adhered with a latex comprising an emulsion copolymer of butadiene and acrylonitrile in which the acrylonitrile content is from 10% to 50% of the copolymer, said latex containing a highly water-soluble organic wetting agent and also containing a hydrophilic colloidal thickening agent in quantity not exceeding 8% of the latex, evaporating water from the latex to at least partially coagulate it and bring it to a translucent condition adhesive toward butadiene acrylonitrile copolymer latex residues in the same conditions and pressing together the surfaces with latex residue coats thereon.

13. A method of cold bonding the surface of a continuous sheet of waterproof resin material plasticized with an ester plasticizer to a porous surface of a body which comprises coating the surfaces to be adhered with a latex comprising an emulsion copolymer of butadiene and acrylonitrile in which the acrylonitrile content is from 10% to 50% of the copolymer, said latex containing from about 0.25% to about 8% of a highly water-soluble organic wetting agent and also containing about 1% to about 8% of ammonium caseinate, evaporating water from the latex to at least partially coagulate it and bring it to a translucent condition adhesive toward butadiene acrylonitrile copolymer latex residues in the same condition, and pressing together the surfaces with latex residue coats thereon.

14. A method of cold bonding the surface of a continuous sheet of waterproof resin material plasticized with an ester plasticizer to a porous surface of a body which comprises coating the surfaces to be adhered with a latex comprising at least about 40% by weight solids of an emulsion copolymer of butadiene and acrylonitrile in which the acrylonitrile is about 25% by weight of the copolymer, said latex containing from about 2% to about 4% of a sulphonated alkylated aromatic wetting agent and also containing from about 3% to about 6% of ammonium caseinate, evaporating water from the latex coat until the coat becomes translucent and actively adhesive toward butadiene acrylonitrile copolymer latex residues in the same condition, and pressing together the surfaces with latex residue coats thereon.

15. A method of cold bonding the surface of a continuous sheet of waterproof resin material plasticized with an ester plasticizer to a porous surface of a body which comprises coating the surface of the body with a latex comprising an emulsion copolymer of butadiene and acrylonitrile, said emulsion containing a highly water-soluble organic wetting agent, removing water from the emulsion to at least partially coagulate it and bring it to a translucent condition adhesive to plasticized resin material, and pressing the surface of the plasticized resin material against the residue coat.

16. A method of cold bonding the surface of a continuous sheet of waterproof resin material plasticized with at least 2% of an ester plasticizer to a porous surface of a body which comprises washing the surface of the plasticized resin material with an organic solvent which will not soften or swell the resin, coating the surface of the body with a latex comprising at least about 40% by weight solids of an emulsion copolymer of butadiene and acrylonitrile in which the acrylonitrile is about 25% by weight of the copolymer, said latex containing from about 2% to about 4% of a sulphonated alkylated aromatic wetting agent and also containing from about 3% to about 6% of ammonium caseinate, evaporating water from the latex coat until the coat becomes translucent and adhesive toward the plasticized resin material, and pressing the surface of the plasticized resin material against the latex residue coat.

17. The method of cold bonding which comprises coating a surface with a volatile organic solvent solution of a resin plasticized with an ester plasticizer, removing solvent from the coating, applying to at least one of the surfaces of the dried resin solution and of a continuous vinyl resin sheet plasticized with an ester plasticizer a latex comprising an emulsion copolymer of butadiene and acrylonitrile, evaporating water from the latex coating until the coating becomes translucent, and bringing the surfaces together.

18. The method of cold bonding which comprises coating a surface with a volatile organic solution of nitrocellulose and an ester plasticizer, removing solvent from the coating, applying to at least one of the surfaces of the dried nitrocellulose solution and of a continuous vinyl resin sheet plasticized with an ester plasticizer a latex comprising an emulsion copolymer of butadiene and acrylonitrile, evaporating water from the latex coating until the coating becomes translucent, and bringing the surfaces together.

19. The method of cold bonding which comprises coating a surface with a volatile organic solvent solution of cellulose acetate and an ester plasticizer, removing solvent from the coating, applying to at least one of the surfaces of the dried cellulose acetate solution and of a continuous vinyl resin sheet plasticized with an ester plasticizer a latex comprising an emulsion copolymer of butadiene and acrylonitrile, evaporating water from the latex coating until the coating comes translucent, and bringing the surfaces together.

20. A method of cold bonding the surface of a continuous sheet of waterproof resin material plasticized with an ester plasticizer to a surface of a second continuous sheet of waterproof resin material plasticized with an ester plasticizer which comprises coating at least one of the surfaces to be adhered with a latex comprising an emulsion copolymer of butadiene and acrylonitrile in which the acrylonitrile content is from 10% to 50% of the copolymer, said latex containing a highly water soluble organic wetting agent and also containing a hydrophilic colloidal thickening agent in quantity not exceeding 8% of the latex, evaporating water from the latex to at least partially coagulate it and bring it to a translucent condition adhesive to plasticized resin material, and bringing the surfaces together.

21. A method of cold bonding a surface of a continuous sheet of waterproof resin material plasticized with an ester plasticizer to the surface of a second continuous sheet of waterproof resin material plasticized with an ester plasticizer which comprises coating one of the surfaces to be adhered with a latex comprising an emulsion copolymer of butadiene and acrylonitrile in which the acrylonitrile is from 10% to 50% of the copolymer, said latex containing a highly water soluble organic wetting agent and also containing a hydrophilic colloidal thickening agent in quantity not exceeding 8% of the latex, evaporating water from the latex coat until the coat becomes translucent and adhesive toward the plasticized resin material, washing the surface of the other sheet of plasticized resin material with an organic solvent which will not soften or swell the resin, and pressing the washed surface of the plasticized resin material against the latex residue coat.

THOMAS C. MORRIS.
ERIC C. JOHNSON.

REFERENCES CITED

The following references are of record in the file of this patent:

UNITED STATES PATENTS

| Number | Name | Date |
|---|---|---|
| 2,087,878 | Wedger | July 20, 1937 |
| 2,290,204 | Nugent | July 21, 1942 |
| 2,323,562 | Nugent | July 6, 1943 |
| 2,352,637 | Juve | July 4, 1944 |
| 2,389,641 | Sarbach | Nov. 27, 1945 |
| 2,403,313 | Taylor | July 2, 1946 |
| 2,410,792 | Ten Broeck | Nov. 5, 1946 |
| 2,416,232 | Soday | Feb. 18, 1947 |
| 2,428,771 | Almy | Oct. 14, 1947 |
| 2,446,101 | Peaker | July 27, 1948 |

FOREIGN PATENTS

| Number | Country | Date |
|---|---|---|
| 430,953 | Great Britain | June 27, 1935 |
| 542,331 | Great Britain | Jan. 5, 1942 |

OTHER REFERENCES

Hycar Synthetic Rubber Blue Book, B. F. Goodrich Co., Cleveland 15, Ohio, copyright 1944 OR–15, VI group A, page 1, dated 3/4/44.

Plastics Catalog, 1945, published by Plastics Catalogue Corp., Dec. 1944, 1226 42nd St. N. Y. C., pp. 1051–1052, page 1052, 2d column, 3rd paragraph of particular interest.